(12) United States Patent
Yin et al.

(10) Patent No.: US 10,127,676 B2
(45) Date of Patent: Nov. 13, 2018

(54) IMAGE-BASED OBJECT COUNTING METHOD AND APPARATUS

(71) Applicant: Hanwha Techwin Co., Ltd., Changwon-si (KR)

(72) Inventors: Shi Min Yin, Changwon-si (KR); Yeon Geol Ryu, Changwon-si (KR)

(73) Assignee: HANWHA AEROSPACE CO., LTD, Suwon-si (KR)

(*) Notice: Subject to any disclaimer, the term of this patent is extended or adjusted under 35 U.S.C. 154(b) by 123 days.

(21) Appl. No.: 15/240,557

(22) Filed: Aug. 18, 2016

(65) Prior Publication Data

US 2017/0116724 A1    Apr. 27, 2017

(30) Foreign Application Priority Data

Oct. 21, 2015    (KR) .......................... 10-2015-0146667

(51) Int. Cl.
 *G06K 9/00* (2006.01)
 *G06T 7/20* (2017.01)
 *G06T 7/70* (2017.01)

(52) U.S. Cl.
 CPC ................. *G06T 7/20* (2013.01); *G06T 7/70* (2017.01); *G06T 2207/30241* (2013.01); *G06T 2207/30242* (2013.01)

(58) Field of Classification Search
 CPC ... G06T 7/20; G06T 7/70; G06T 2207/30241; G06T 2207/30242
 See application file for complete search history.

(56) References Cited

U.S. PATENT DOCUMENTS

| | | | | |
|---|---|---|---|---|
| 5,574,762 | A * | 11/1996 | Sato ................... | G06K 9/00778 377/10 |
| 7,038,577 | B2 * | 5/2006 | Pawlicki ............ | B60K 31/0008 340/435 |
| 8,897,492 | B2 | 11/2014 | Chou et al. | |
| 9,466,119 | B2 * | 10/2016 | Bae .......................... | G06T 7/20 |
| 2008/0212099 | A1 | 9/2008 | Chen | |
| 2010/0124356 | A1 | 5/2010 | Hampapur et al. | |
| 2013/0148848 | A1 | 6/2013 | Lee et al. | |

FOREIGN PATENT DOCUMENTS

KR    10-2013-0000633 A    1/2013

* cited by examiner

*Primary Examiner* — Shefali Goradia
(74) *Attorney, Agent, or Firm* — Sughrue Mion, PLLC

(57) ABSTRACT

An image-based object counting method includes rasterizing a counting line in an image into counting line pixels; determining two points on a trajectory line included in the image, as target pixels; determining, from the counting line pixels, corresponding pixels that corresponds to the target pixels; determining whether the counting line intersects with the trajectory line based on the target pixels and the corresponding pixels; and determining the number of one or more trajectory lines including the trajectory line that intersect with the counting line as the number of objects that pass through the counting line.

17 Claims, 14 Drawing Sheets

IMAGE-BASED OBJECT COUNTING METHOD AND APPARATUS

CROSS-REFERENCE TO RELATED PATENT APPLICATION

This application claims priority from Korean Patent Application No. 10-2015-0146667, filed on Oct. 21, 2015 in the Korean Intellectual Property Office, the disclosure of which is incorporated herein by reference in its entirety.

BACKGROUND

1. Field

Apparatuses and methods consistent with exemplary embodiments relate to counting the number of objects in an image by determining whether a counting line intersects with a trajectory line.

2. Description of the Related Art

Object counting or people counting may refer to counting the number of objects or people that enter a specific area or cross a boundary of the area. When an image is used for object counting, information about whether an object has crossed a boundary may be obtained.

SUMMARY

One or more exemplary embodiments provide an image-based object counting method and apparatus capable of determining whether an object has passed a counting line, by using a determination as to whether the counting line and a trajectory line intersect.

One or more exemplary embodiments include an image-based object counting method and apparatus capable of reducing the number of calculations for object counting, by determining whether a counting line and a trajectory line intersected or not and an intersection direction between the counting line and the trajectory line by comparing only coordinate values of two points on the trajectory line with coordinates values of points on the counting line.

According to an aspect of an exemplary embodiment, there is provided an image-based object counting method including: rasterizing a counting line in an image into counting line pixels; determining two points on a trajectory line included in the image as target pixels; determining, from the counting line pixels, corresponding pixels that correspond to the target pixels; determining whether the counting line intersects with the trajectory line based on the target pixels and the corresponding pixels; and determining the number of one or more trajectory lines including the trajectory line that intersect with the counting line as the number of objects that pass the counting line.

The determining of whether the counting line intersects with the trajectory line may include determining that the counting line intersects with the trajectory line when a first result of comparison between a first target pixel from the two target pixels and a first corresponding pixel corresponding to the first target pixel is different from a second result of comparison between a second target pixel from the two target pixels and a second corresponding pixel corresponding to the second target pixel.

The determining of the corresponding pixels may include, when one of two direction coordinates is a reference direction coordinate, determining, as the corresponding pixels, pixels having same reference direction coordinate values as the target pixels from among the counting line pixels. The determining of whether the counting line intersects with the trajectory line may include, when the other direction coordinate is a comparative direction coordinate, acquiring, as the first result of the comparison, whether a difference between a comparative direction coordinate value of the first target pixel and a comparative direction coordinate value of the first corresponding pixel is greater than 0, and acquiring, as the second result of the comparison, whether a difference between a comparative direction coordinate value of the second target pixel and a comparative direction coordinate value of the second corresponding pixel is greater than 0.

The image-based object counting method may further include generating an index list including the counting line pixels, and the determining of the corresponding pixels may include determining whether the corresponding pixels corresponding to the target pixels exist within the index list; re-generating the index list when the corresponding pixels do not exist within the index list; and determining the corresponding pixels from among the re-generated index list.

The re-generating of the index list may include generating an extending line that extends from the counting line; rasterizing the extending line in the image into extending line pixels, and regenerating the index list including the counting line pixels and the extending line pixels.

The determining of whether the counting line intersects with the trajectory line may include classifying the index list into a plurality of sections when the extending line pixels are included in the index list; and re-determining the target pixels when the corresponding pixels respectively belong to two different sections of the plurality of sections.

The classifying of the index list into the plurality of sections may include classifying the index list into a first external section corresponding to a first extending line piece not overlapping the counting line, the first extending line piece including a point adjacent to one of two end points of the counting line, a second external section corresponding to a second extending line piece not overlapping the counting line, the second extending line piece including a point adjacent to the other end point, and an internal section corresponding to a third extending line piece overlapped by the counting line, the internal section including the two end points of the counting line.

The determining of whether the counting line intersects with the trajectory line may include determining that the counting line does not intersect with the trajectory line when all of the corresponding pixels belong to the first external section or the second external section, and determining that the counting line intersects with the trajectory line, when all of the corresponding pixels belong to the internal section.

The re-determining of the corresponding pixels may include determining one point on the trajectory line as an additional target pixel; acquiring an additional corresponding pixel corresponding to the additional target pixel from among the index list; selecting a target pixel from the target pixels based on the target pixels, the additional target pixel, the corresponding pixels, and the additional corresponding pixel; and determining the selected target pixel and the additional target pixel as the target pixels.

The determining of the additional target pixel may include determining a center point between the target pixels as the additional target pixel.

The selecting of the one from the target pixels may include selecting a first target pixel from the target pixels when a first result of comparison between the first target pixel and a first corresponding pixel corresponding to the first target pixel is different from an additional result of comparison between the additional target pixel and the additional corresponding pixel.

The image-based object counting method may include generating an extending line that extends from the counting line; rasterizing the extending line in the image into extending line pixels, and generating an index list including the counting line pixels and the extending line pixels.

The determining of the corresponding pixels may include determining one of the two direction coordinates as the reference direction coordinate and determining the other direction coordinate as the comparative direction coordinate, based on an inclination of the counting line.

The determining of whether the counting line intersects with the trajectory line may include further determining an intersecting direction of an object that moves along the trajectory line when the counting line and the trajectory line intersect. The determining the number of one or more trajectory lines may include counting the number of objects for each intersecting direction.

The determining of whether the counting line intersects with the trajectory line may include, when the difference between the comparative direction coordinate value of the first target pixel and the comparative direction coordinate value of the first corresponding pixel is greater than 0, determining that the intersecting direction is a first intersecting direction, and when the difference between the comparative direction coordinate value of the second target pixel and the comparative direction coordinate value of the second corresponding pixel is greater than 0, determining that the intersecting direction is a second intersecting direction different from the first intersecting direction.

According to an aspect of another exemplary embodiment, there is provided an image-based object counting apparatus including one or more processors implementing: an index generator configured to rasterize a counting line in an image into counting line pixels and generate an index list including the counting line pixels; a target pixel determiner configured to determine two points on a trajectory line included in the image as target pixels; a corresponding pixel determiner configured to determine corresponding pixels that correspond to the target pixels from among the index list; an intersection determiner configured to determine whether the counting line intersects with the trajectory line, based on the target pixels and the corresponding pixels; and an object counter configured to count the number of one or more trajectory lines including the trajectory line that intersect with the counting line as the number of objects that pass the counting line.

BRIEF DESCRIPTION OF THE DRAWINGS

The above and/or other aspects will more apparent by describing certain exemplary embodiments, with reference to the accompanying drawings, in which.

DETAILED DESCRIPTION

Figure 1:
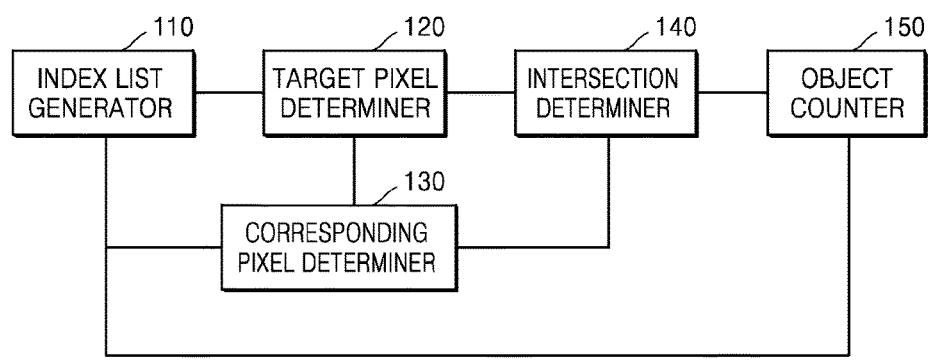
FIG. 1 is a block diagram of a structure of an image-based object counting apparatus according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

While such terms as "first," "second," etc., may be used to describe various components, such components must not be limited to the above terms. The above terms are used only to distinguish one component from another.

The terms used in the present specification are merely used to describe particular embodiments, and are not intended to limit the scope of the inventive concept. An expression used in the singular encompasses the expression of the plural, unless it has a clearly different meaning in the context. In embodiments below, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Embodiments may be described in terms of functional block components and various processing steps. Such functional blocks may be realized by any number of hardware and/or software components configured to perform the specified functions. For example, embodiments may employ various integrated circuit (IC) components, e.g., memory elements, processing elements, logic elements, look-up tables, and the like, which may carry out a variety of functions under the control of one or more microprocessors or other control devices. Similarly, where elements in embodiments described herein are implemented using software programming or software elements, the embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the embodiments described herein could employ any number of conventional techniques for electronics configuration, signal processing and/or control, data processing and the like. The words "mechanism," "element," "means," and "configuration" are used broadly and are not limited to mechanical or physical embodiments, but can include software routines in conjunction with processors, etc.

Like reference numerals in the specification and drawings denote like elements, and thus their description will be omitted.

FIG. 1 is a block diagram of a structure of an image-based object counting apparatus according to an exemplary embodiment.

Referring to FIG. 1, the image-based object counting apparatus according to an exemplary embodiment may include an index list generator 110, a target pixel determiner 120, a corresponding pixel determiner 130, an intersection determiner 140, and an object counter 150. The index list generator 110, the target pixel determiner 120, the corresponding pixel determiner 130, the intersection determiner 140, and the object counter 150 may be implemented by one or more processors.

When a counting line is set on an image including a trajectory line, the index list generator 110 acquires counting line pixels by rasterizing the counting line on the image, and generates an index list including the counting line pixels.

The image includes pixels in a two-dimensional (2D) arrangement, and each of the pixels may have a 2D coordinate. For example, a specific pixel P may have a 2D coordinate, such as (12, 24).

The image may include a plurality of trajectory lines. For example, the image may include a number of trajectory lines acquired by camera tracking movement paths of objects for a specific period.

When a counting line that connects two specific points in an image is set and the number of trajectory lines intersecting with the counting line is calculated, the number of objects having passed through the counting line for a specific period may be ascertained.

Rasterization of the counting line may be obtaining an image in a vector format and converting a counting line in the image into pixels or dots.

An index list may include the pixels corresponding to the counting line in a particular order. For example, the index list may be generated by setting a pixel at one end point of the counting line as a start pixel and setting a pixel adjacent to the start pixel as a next pixel.

When the counting line is set to be relatively short on the image, there is a possibility that a pixel corresponding to a target pixel does not exist within the index list. A determination as to whether a pixel corresponding to a target pixel exists within an index list will be described later when the corresponding pixel determiner 130 is described.

When no corresponding pixels corresponding to a target pixel exist within the index list, the index list generator 110 may generate an extending line for the counting line such that a corresponding pixel corresponding to the target pixel exists within the index list.

The index list generator 110 may acquire extending line pixels by rasterizing the extending line in the image, and re-generate an index list including the extending line pixels.

The extending line may be generated in an inclination direction of the counting line from at least one of two end points of the counting line and in a direction in which the counting line extends from the at least one of two end points of the counting line.

The extending line may be generated by including the existing counting line such that it overlaps with the existing counting line, or may be generated by including only a portion that does not overlap with the existing counting line.

When the extending line is generated by including the existing counting line, the index list may be generated such that the counting line pixels and the extending line pixels do not overlap with each other.

The target pixel determiner 120 determines two points on a trajectory line included in the image, as target pixels.

For example, the target pixel determiner 120 may determine two end points of the trajectory line as the target pixels.

According to an exemplary embodiment, in response to a target pixel re-determination request, the target pixel determiner 120 may determine one point on the trajectory line as a new target pixel and may exclude one among existing target pixels from the target pixels.

For example, the target pixel determiner 120 may determine a center point between the existing target pixels as an additional target pixel.

In greater detail, when the existing target pixels are P(12, 24) and Q(20, 12), the target pixel determiner 120 may determine M(16, 18) corresponding to a center point between the existing target pixels P(12, 24) and Q(20, 12) as an additional target pixel.

The target pixel determiner 120 may select one from the existing target pixels as another new target pixel and exclude an unselected pixel from the new target pixels.

Since the intersection determiner 140, which will be described later, determines that the counting line (or the extending line of the counting line) and the trajectory line intersect, an intersection exists between a first corresponding pixel and a second corresponding pixel. When an additional target pixel is determined from among pixels existing between a first target pixel and a second target pixel and an additional corresponding pixel corresponding to the additional target pixel is determined, an intersection may exist between the first corresponding pixel and the additional corresponding pixel or between the additional corresponding pixel and the second corresponding pixel.

The target pixel determiner 120 may determine two pixels having an intersection therebetween as target pixels.

To this end, when a result of a comparison between the previously determined first target pixel and the previously determined first corresponding pixel is different from that between the newly determined additional target pixel and the newly determined additional corresponding pixel, the target pixel determiner 120 may consider that an intersection exists between the first corresponding pixel and the additional corresponding pixel, and determine the first target pixel and the additional target pixel as target pixels. On the other hand, when the result of the comparison between the previously determined first target pixel and the previously determined first corresponding pixel is identical with that between the newly determined additional target pixel and the newly-determined additional corresponding pixel, the target pixel determiner 120 may consider that no intersections exist between the first corresponding pixel and the additional corresponding pixel, and determine the second target pixel and the additional target pixel as target pixels. For example, the target pixel determiner 120 may determine that two pixels are target pixels if a trajectory line connecting the two pixels intersects with a counting line.

The corresponding pixel determiner 130 determines corresponding pixels corresponding to the target pixels within the index list.

When one of two direction coordinates is a reference direction coordinate, the corresponding pixel determiner 130 may determine, as a corresponding pixel, a pixel having the same reference direction coordinate value as a target pixel within the index list.

For example, the two direction coordinates may be an x-direction coordinate and a y-direction coordinate.

When the x-direction coordinate is a reference direction coordinate, the corresponding pixel determiner 130 may determine, as a corresponding pixel, a pixel having the same x-direction coordinate value as a target pixel within the index list.

When the x-direction coordinate is a reference direction coordinate and a target pixel is P(12, 24), the corresponding pixel determiner 130 may determine as a corresponding pixel a pixel P'(12, 20) having an x-direction coordinate value of 12 within the index list.

According to an exemplary embodiment, the corresponding pixel determiner 130 may determine whether corresponding pixels corresponding to target pixels exist in the index list.

For example, when the x-direction coordinate is a reference direction coordinate, a target pixel is P(12, 24), and a pixel having an x-direction coordinate value of 12 does not exist in the index list, the corresponding pixel determiner 130 may determine that a corresponding pixel corresponding to the target pixel does not exist in the index list.

In this case, the corresponding pixel determiner 130 may request the index list generator 110 to re-generate an index list, and determine corresponding pixels corresponding to target pixels within the re-generated index list. At least one of the determined corresponding pixels may correspond to an extending line pixel.

According to an exemplary embodiment, when the target pixel determiner 120 re-determines a target pixel, the corresponding pixel determiner 130 may re-determine a corresponding pixel corresponding to the re-determined target pixel.

According to an exemplary embodiment, the corresponding pixel determiner 130 may determine a reference direction coordinate and a comparative direction coordinate, based on the inclination of the counting line.

For example, when the inclination of the counting line is between −1 and 1, the corresponding pixel determiner 130 may set the x-direction coordinate as the reference direction coordinate and the y-direction coordinate as the comparative direction coordinate. When the inclination of the counting line is not between −1 and 1, the corresponding pixel determiner 130 may set the y-direction coordinate as the reference direction coordinate and the x-direction coordinate as the comparative direction coordinate.

The intersection determiner 140 determines whether the counting line and the trajectory line intersect.

When two points of the trajectory line respectively belong to two areas defined by the counting line (or the extending line of the counting line), it may be considered that the counting line (or the extending line of the counting line) and the trajectory line intersect.

The intersection determiner 140 may determine whether the counting line and the trajectory line intersect, by comparing the target pixels and the corresponding pixels on the index list generated by rasterizing the counting line.

For example, when a first comparison result between the first target pixel and the first corresponding pixel is different from a second comparison result between the second target pixel and the second corresponding pixel, the intersection determiner 140 may determine that the counting line and the trajectory line intersect.

In greater detail, the intersection determiner 140 may acquire, as the first comparison result, whether a difference between the comparative direction coordinate value of the first target pixel and the comparative direction coordinate value of the first corresponding pixel is greater than 0. The intersection determiner 140 may acquire, as the second comparison result, whether a difference between the comparative direction coordinate value of the second target pixel and the comparative direction coordinate value of the second corresponding pixel is greater than 0, and determine that the counting line and the trajectory line intersect, when the first and second comparison results are different.

According to an exemplary embodiment, the intersection determiner 140 may determine that the trajectory line intersects with the extending line of the counting line rather than with the counting line due to setting of the counting line to be relatively short on the image.

Even in this case, to determine whether the counting line and the trajectory line intersect, when the index list is re-generated by the index list generator 110 and the extending line pixels are included in the index list, target pixels may be allowed to be reset according to specific conditions, and thus the intersection determiner 140 may determine whether the trajectory line intersects with the counting line or the extending line of the counting line.

First, the intersection determiner 140 may classify the index list into a plurality of sections.

In greater detail, the intersection determiner 140 may classify pixels corresponding to the counting line and the two end points of the counting line in the index list into an internal section, classify pixels corresponding to an extension direction from one end point of the counting line into a first external section, and classify pixels corresponding to an extension direction from the other end point of the counting line into a second external section.

When all corresponding pixels belong to the internal section, the intersection determiner 140 may determine that the trajectory line intersects with the counting line. When all of the corresponding pixels belong to the first external section or the second external section, the intersection determiner 140 may determine that the trajectory line does not intersect with the counting line.

When the corresponding pixels respectively belong to two or more sections, the intersection determiner 140 may request the target pixel determiner 120 to re-determine target pixels. In this case, the target pixels may be re-determined by the target pixel determiner 120, and corresponding pixels corresponding to the re-determined target pixels may be re-determined by the corresponding pixel determiner 130.

The intersection determiner 140 may repeat such a section determination process until the intersecting or non-intersecting determination may be made with respect to a re-determined target pixel and a re-determined corresponding pixel.

According to an exemplary embodiment, the intersection determiner 140 may further determine an intersecting direction of an object when the counting line and the trajectory line intersect.

In greater detail, when the difference between the comparative direction coordinate value of the first target pixel and the comparative direction coordinate value of the first corresponding pixel is greater than 0, the intersection determiner 140 may determine that the intersecting direction is a first intersecting direction. When the difference between the comparative direction coordinate value of the second target pixel and the comparative direction coordinate value of the second corresponding pixel is greater than 0, the intersection determiner 140 may determine that the intersecting direction is a second intersecting direction different from the first intersecting direction.

The object counter 150 determines the number of objects having passed through the counting line, by counting the number of trajectory lines that intersect with the counting line.

According to an exemplary embodiment, when the intersection determiner 140 determines based on the intersecting direction, the object counter 150 may determine the number of objects for each direction in which the objects pass through the counting line.

Figure 2:
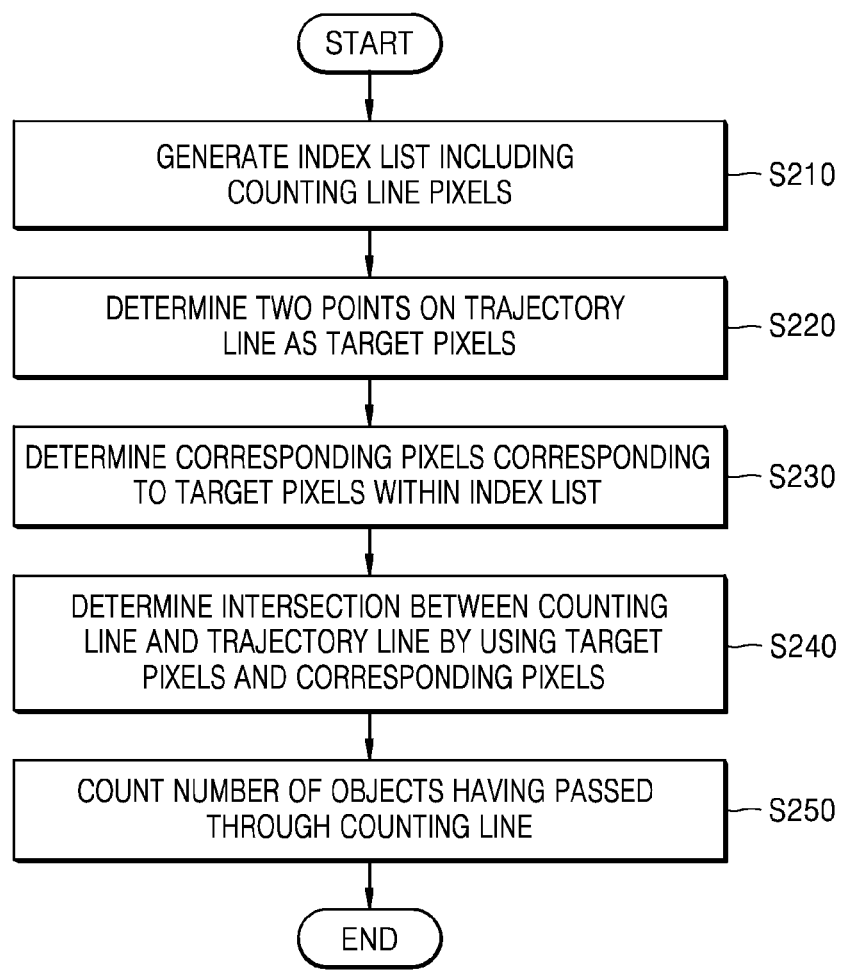
FIG. 2 is a flowchart of an image-based object counting method according to an exemplary embodiment.

FIG. 2 is a flowchart of an image-based object counting method according to an exemplary embodiment.

Referring to FIGS. 1 and 2, the image-based object counting method according to an exemplary embodiment includes operation S210 in which the index list generator 110 generates an index list including counting line pixels, operation S220 in which the target pixel determiner 120 determines two points on a trajectory line as target pixels, operation S230 in which the corresponding pixel determiner 130 determines corresponding pixels corresponding to the target pixels within the index list, operation S240 in which the intersection determiner 140 determines intersecting or non-intersecting between a counting line and the trajectory line by using the target pixels and the corresponding pixels, and operation S250 in which the object counter 150 counts the number of objects having passed through the counting line.

First, the index list generator 110 acquires the counting line pixels by rasterizing the counting line in an image and generates the index list including the counting line pixels, in operation S210.

According to an exemplary embodiment, when the counting line is set to be relatively short on the image and thus the index list is generated by using only the counting line, corresponding pixels corresponding to target pixels do not exist in the index list. In this case, in operation S210, the index list generator 110 may generate an extending line that extends from both ends or either end of the counting line.

At this time, the index list generator 110 may acquire counting line pixels and extending line pixels by rasterizing the counting line and the extending line on the image, and generate an index list including the counting line pixels and the extending line pixels.

Next, in operation S220, the target pixel determiner 120 determines two points on a trajectory line included in the image as target pixels.

For example, in operation S220, the target pixel determiner 120 may determine two end points of the trajectory line as the target pixels.

Next, in operation S230, the corresponding pixel determiner 130 determines corresponding pixels corresponding to the target pixels within the index list.

In operation S230, the corresponding pixel determiner 130 may determine one of two direction coordinates as a reference direction coordinate based on the inclination of the counting line, determine the other direction coordinate as a comparative direction coordinate, and determine, as a corresponding pixel, a pixel having the same reference direction coordinate value as a target pixel within the index list.

Next, in operation S240, the intersection determiner 140 determines whether the counting line intersects with the trajectory line based on the target pixels and the corresponding pixels.

In operation S240, when the other direction coordinate from among the two direction coordinates is a comparative direction coordinate, the intersection determiner 140 may acquire, as a first comparison result, whether a difference between the comparative direction coordinate value of the first target pixel and the comparative direction coordinate value of the first corresponding pixel is greater than 0, acquire, as a second comparison result, whether a difference between the comparative direction coordinate value of the second target pixel and the comparative direction coordinate value of the second corresponding pixel is greater than 0, and determine that the counting line and the trajectory line intersect, when the first and second comparison results are different.

According to an exemplary embodiment, in operation S240, the intersection determiner 140 may further determine an intersecting direction of an object when the counting line and the trajectory line intersect.

In operation S240, when the difference between the comparative direction coordinate value of the first target pixel and the comparative direction coordinate value of the first corresponding pixel is greater than 0, the intersection determiner 140 may determine that the intersecting direction is a first intersecting direction. When the difference between the comparative direction coordinate value of the second target pixel and the comparative direction coordinate value of the second corresponding pixel is greater than 0, the intersection determiner 140 may determine that the intersecting direction is a second intersecting direction different from the first intersecting direction.

Finally, in operation S250, the object counter 150 counts, as the number of objects having passed through the counting line, the number of trajectory lines that intersect with the counting line.

In operation S250, when the intersecting direction is further determined in operation S240, the object counter 150 may count the number of objects for each intersecting direction.

Figure 3:
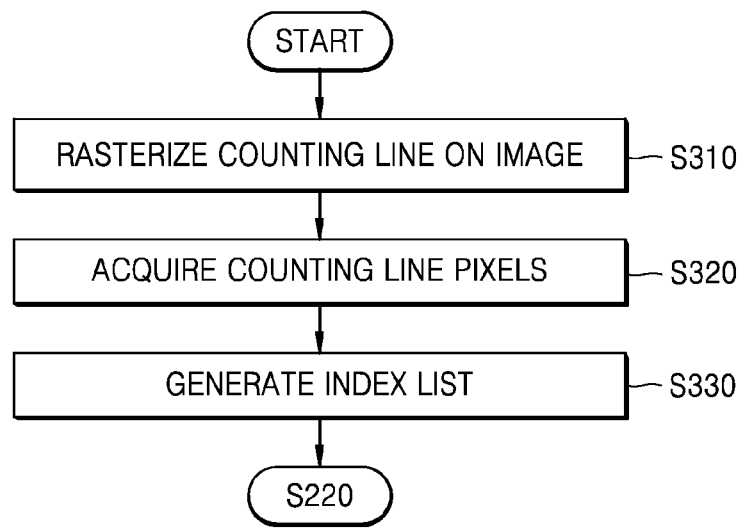
FIG. 3 is a flowchart of a method of generating an index list, according to an exemplary embodiment.

FIG. 3 is a flowchart of a method of generating an index list, according to an exemplary embodiment.

Referring to FIGS. 1 and 3, the method of generating an index list according to an exemplary embodiment includes operation S310 in which the index list generator 110 of FIG. 1 rasterizes a counting line in an image, operation S320 in which the index list generator 110 acquires counting line pixels, and operation S330 in which the index list generator 110 generates the index list.

In operation S310, the index list generator 110 may rasterize a counting line carrying vector information into a counting line carrying scalar information by making the counting line of the vector information correspond to the image.

In operation S320, the index list generator 110 may acquire, as counting line pixels, a collection of pixels corresponding to the rasterized counting line on the image.

In operation S330, the index list generator 110 may generate the index list that includes the counting line pixels in a certain order.

Figure 4:
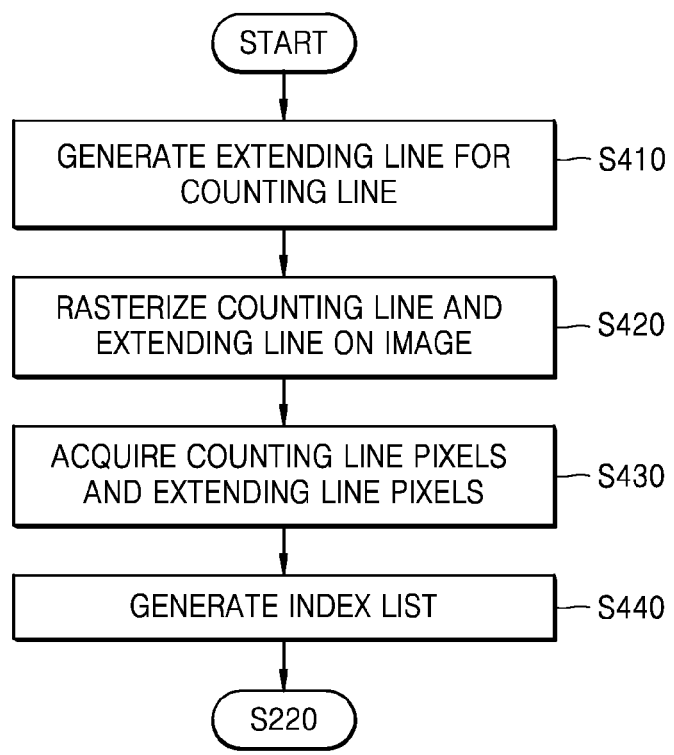
FIG. 4 is a flowchart of a method of generating an index list, according to another exemplary embodiment.

FIG. 4 is a flowchart of a method of generating an index list, according to another exemplary embodiment.

Referring to FIGS. 1 and 4, the method of generating an index list according to another exemplary embodiment includes operation S410 in which the index list generator 110 generates an extending line for a counting line, operation S420 in which the index list generator 110 rasterizes the counting line and the extending line in an image, operation S430 in which the index list generator 110 acquires counting line pixels and extending line pixels, and operation S440 in which the index list generator 110 generates the index list.

In operation S410, the index list generator 110 may generate the extending line from at least one of two end points of the counting line in an inclination direction of the counting line and in a direction in which the counting line extends.

In operation S410, the extending line may be generated by including the existing counting line such that it overlaps with the existing counting line, or may be generated by including only a portion that does not overlap with the existing counting line.

In operation S420, the index list generator 110 may rasterize a counting line including vector information and an extending line of the counting line into a counting line including scalar information and an extending line of the counting line by making the counting line of the vector information and the extending line of the counting line correspond to the image.

In operation S430, the index list generator 110 may acquire, as counting line pixels and extending line pixels, a collection of pixels corresponding to the rasterized counting line and the rasterized extending line on the image.

In operation S440, the index list generator 110 may generate the index list that includes the counting line pixels and the extending line pixels in a certain order.

In operation S440, when the extending line is generated by including the existing counting line, the index list may be generated such that the counting line pixels and the extending line pixels do not overlap with each other. For example, when the extending line is generated by including the existing counting line from the at least one of two end points of the counting line, in an inclination direction of the counting line and in a direction in which the counting line extends, all of the counting line pixels overlap with the extending line pixels. Thus, the index list generator 110 may include only either the counting line pixels or extending line pixels overlapped with the counting line pixels in the index list.

Figure 5:
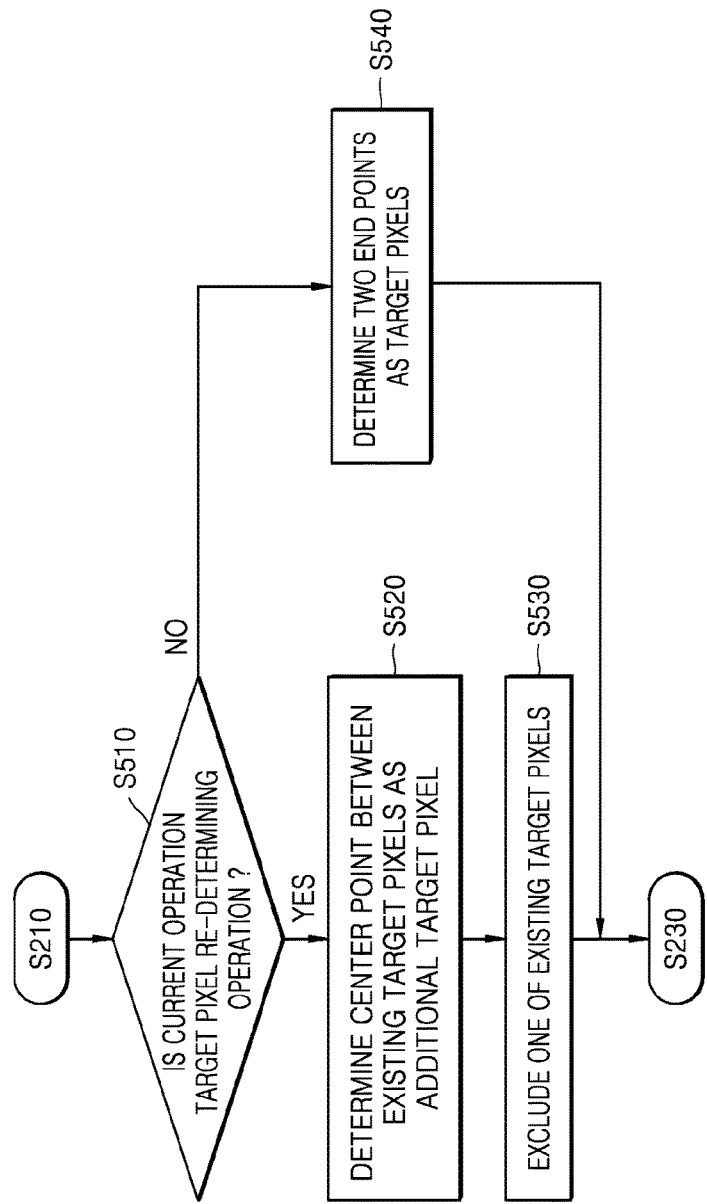
FIG. 5 is a flowchart of a method of determining a target pixel, according to an exemplary embodiment.

FIG. 5 is a flowchart of a method of determining a target pixel, according to an exemplary embodiment.

Referring to FIGS. 1 and 5, the method of determining a target pixel according to an exemplary embodiment includes operation S510 of determining whether a current operation is a target pixel re-determining operation, operation S540 in which, when the current operation is not the target pixel re-determining operation, the target pixel determiner 120 determines two end points as target pixels, operation S520 in which, the current operation is the target pixel re-determining operation, the target pixel determiner 120 determines a center point between existing target pixels as an additional target pixel, and operation S530 in which the target pixel determiner 120 excludes one of the existing target pixels.

First, the target pixel determiner 120 determines whether a current operation is a target pixel re-determining operation, in operation S510.

Figure 9:
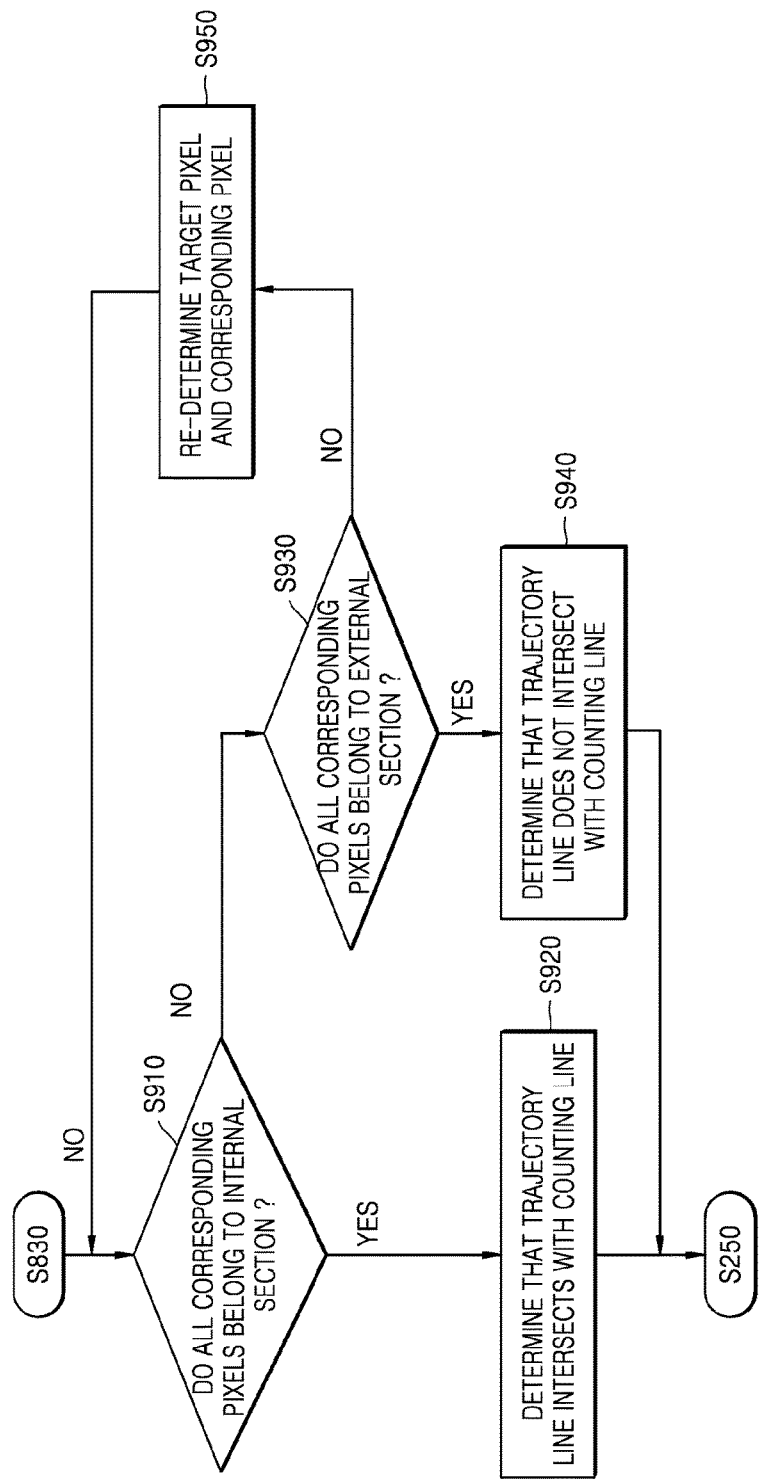
FIG. 9 is a flowchart of an intersecting or non-intersecting determining method according to another exemplary embodiment.

When an extending line is generated as in FIG. 9 and the intersection determiner 140 makes a target pixel re-determining request because two corresponding pixels do not belong to one section (see operation S950 of FIG. 9), in operation S510, the target pixel determiner 120 may determine whether a current operation is a target pixel re-determining operation.

In operation S510, the current operation is determined as the target pixel re-determining operation, when the extending line of the counting line is determined as intersecting with the trajectory line and thus an intersection exists between a first corresponding pixel and a second corresponding pixel. When an additional target pixel is determined from among pixels existing between a first target pixel and a second target pixel and an additional corresponding pixel corresponding to the additional target pixel is determined, an intersection may exist between the first corresponding pixel and the additional corresponding pixel or between the additional corresponding pixel and the second corresponding pixel.

To this end, the target pixel determiner 120 determines the center point between the existing target pixels as the additional target pixel, in operation S520.

According to an exemplary embodiment, in operation S520, the target pixel determiner 120 may determine one point existing between the existing target pixels as the additional target pixel.

Next, the target pixel determiner 120 excludes one from the existing target pixels, in operation S530.

In operation S530, the target pixel determiner 120 determines only pixels corresponding to two corresponding pixels having an intersection therebetween as new target pixels, and excludes a pixel corresponding to the other corresponding pixel from the existing target pixels.

To this end, the target pixel determiner 120 may acquire a first comparison result by comparing the first target pixel, which is one of the existing target pixels, with the first corresponding pixel, acquire an additional comparison result by comparing the additional target pixel with the additional corresponding pixel, consider that no intersections exist between the first corresponding pixel and the additional corresponding pixel, when the first comparison result is identical with the additional comparison result, and exclude the first target pixel.

As a result of operation S530, the target pixel determiner 120 determines one selected from the existing target pixels and the additional target pixel as new target pixels.

In such an example, when the first comparison result is identical with the additional comparison result, the target pixel determiner 120 determines the second target pixel and the additional target pixel as the new target pixels, and determines that an intersection exists between the second corresponding pixel and the additional corresponding pixel.

On the other hand, when it is determined in operation S510 that the current operation is not the target pixel re-determining operation, the target pixel determiner 120 determines the two end points as target pixels, in operation S540.

Figure 6:
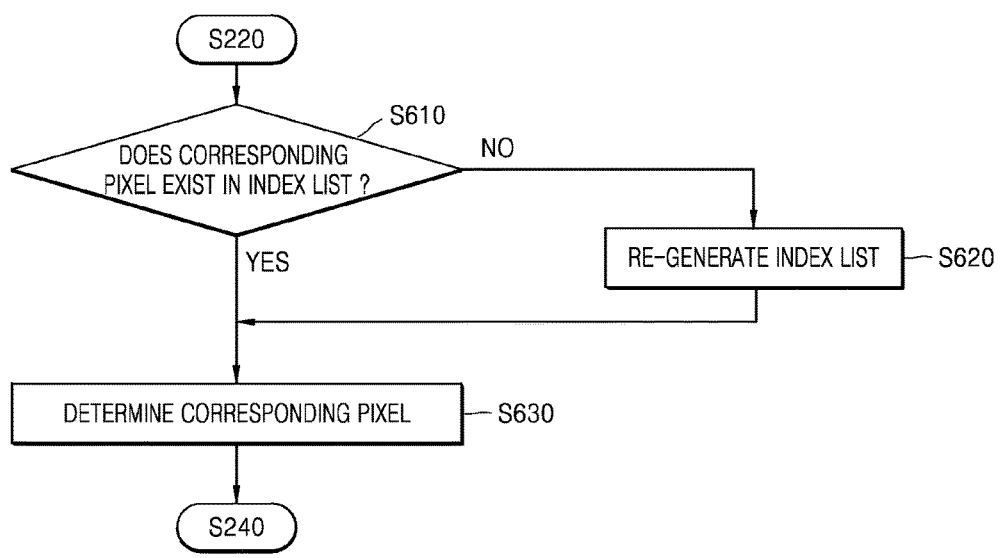
FIG. 6 is a flowchart of a method of determining a corresponding pixel, according to an exemplary embodiment.

FIG. 6 is a flowchart of a method of determining a corresponding pixel, according to an exemplary embodiment.

Referring to FIGS. 1 and 6, the method of determining a corresponding pixel according to an exemplary embodiment includes operation S610 in which the corresponding pixel determiner 130 determines whether a corresponding pixel exists in the index list, operation S620 in which, when no corresponding pixels exist, the index list generator 110 re-generates an index list, and operation S630 in which, when corresponding pixels exist, the corresponding pixel determiner 130 determines a corresponding pixel.

When the counting line is set to be relatively short on the image, there is a possibility that a corresponding pixel corresponding to a target pixel does not exist within the index list. The corresponding pixel may refer to a pixel on the counting line that has the same x value as the target pixel when the x-axis is a reference axis, or a pixel on the counting line that has the same y value as the target pixel when the y-axis is the reference axis.

First, the corresponding pixel determiner 130 determines whether a corresponding pixel exists in the index list.

In operation S610, when a pixel having the same reference direction coordinate value as a target pixel does not exist within the index list, the corresponding pixel determiner 130 may determine that a corresponding pixel does not exist in the index list.

For example, when the x-direction coordinate is a reference direction coordinate, a target pixel is P(12, 24), and a pixel having an x-direction coordinate value of 12 does not exist in the index list, the corresponding pixel determiner 130 may determine that a corresponding pixel corresponding to the target pixel does not exist in the index list.

When it is determined in operation S610 that no corresponding pixels exist, the corresponding pixel determiner 130 requests the index list generator 110 to re-generate an index list, and thus the index list generator 110 re-generates an index list, in operation S620.

On the other hand, when it is determined in operation S610 that corresponding pixels exist, the corresponding pixel determiner 130 determines a corresponding pixel, in operation S630.

In operation S630, the corresponding pixel determiner 130 may determine, as a corresponding pixel, a pixel having the same reference direction coordinate value as a target pixel within the index list.

When the x-direction coordinate is a reference direction coordinate and a target pixel is P(12, 24), the corresponding pixel determiner 130 may determine as a corresponding pixel a pixel P'(12, 20) having an x-direction coordinate value of 12 within the index list.

Figure 7:
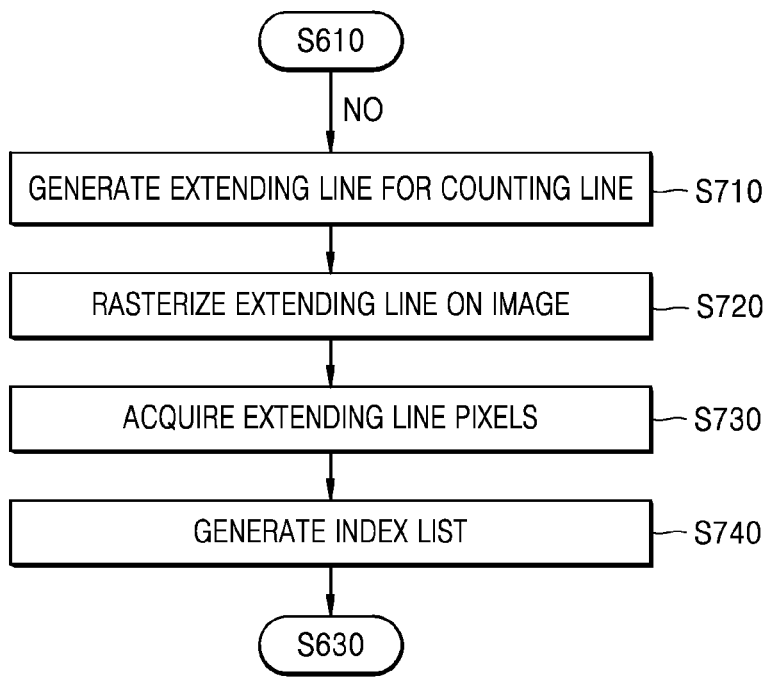
FIG. 7 is a flowchart of a method of re-generating an index list, according to an exemplary embodiment.

FIG. 7 is a flowchart of a method of re-generating an index list, according to an exemplary embodiment.

Referring to FIGS. 1 and 7, when no corresponding pixels exist within the index list (see operation S610 of FIG. 6), the method of re-generating an index list according to an exemplary embodiment includes operation S710 in which the index list generator 110 generates an extending line for the counting line, operation S720 in which the index list generator 110 rasterizes the extending line on the image, operation S730 in which the index list generator 110 acquires extending line pixels, and operation S740 in which the index list generator 110 generates an index list.

In operation S710, the index list generator 110 may generate the extending line from the at least one of two end points of the counting line in an inclination direction of the counting and in a direction in which the counting line extends.

In operation S710, the extending line may be generated by including the existing counting line such that it overlaps with the existing counting line, or may be generated by including only a portion that does not overlap with the existing counting line.

In operation S720, the index list generator 110 may rasterize an extending line comprised of vector information into an extending line comprised of scalar information by making the extending line of the vector information correspond to the image.

In operation S730, the index list generator 110 may acquire, as the extending line pixels, a collection of pixels corresponding to the rasterized extending line on the image.

In operation S740, the index list generator 110 may generate the index list by including the counting line pixels included in the existing index list and the extending line pixels in a certain order.

In operation S740, when the extending line is generated by including the existing counting line, the index list may be generated such that the counting line pixels and the extending line pixels do not overlap with each other. For example, when the extending line is generated by including the existing counting line from at least one of two end points of the counting line in an inclination direction of the counting line and in a direction in which the counting line extends, all of the counting line pixels overlap with the extending line pixels. Thus, the index list generator 110 may include only one of overlapped pixels in the index list.

Figure 8:
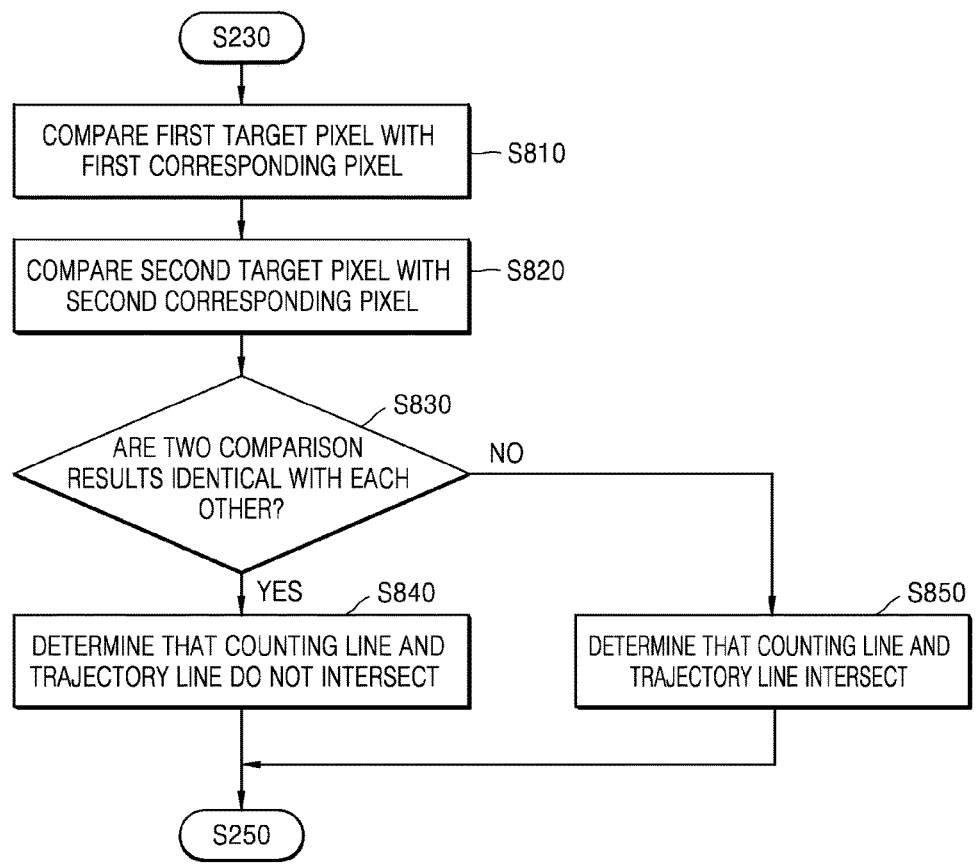
FIG. 8 is a flowchart of an intersecting or non-intersecting determining method according to an exemplary embodiment.

FIG. 8 is a flowchart of a method of determining an intersection according to an exemplary embodiment.

Referring to FIGS. 1 and 8, the method of determining an intersection according to an exemplary embodiment includes operation S810 in which the intersection determiner 140 compares the first target pixel with the first corresponding pixel, operation S820 in which the intersection determiner 140 compares the second target pixel with the second corresponding pixel, operation S830 in which the intersection determiner 140 determines whether the two comparison results are identical with each other, and operations S840 and S850 in which the intersection determiner 140 determines whether the counting line and the trajectory line intersect or not according to a result of the determination in operation S830.

When two points of the trajectory line respectively belong to two areas defined by the counting line (or the extending line of the counting line) as described above, it may be considered that the counting line (or the extending line of the counting line) and the trajectory line intersect. To this end, in operations of FIG. 8, the intersection determiner 140 determines whether the counting line intersects with the trajectory line by determining whether a first comparison result between the first target pixel and the first corresponding pixel with a second comparison result between the second target pixel and the second corresponding pixel.

In operation S810, the intersection determiner 140 compares the first target pixel with the first corresponding pixel.

The first target pixel is one point on the trajectory line, the first corresponding pixel is one point on the counting line, and the two pixels have the same reference direction coordinate value.

For example, the intersection determiner 140 compares the comparative direction coordinate values of two pixels with each other. When the comparative direction coordinate value of the first target pixel is greater than that of the first corresponding pixel, the intersection determiner 140 acquires 'greater' as the first comparison result.

In operation S820, the intersection determiner 140 compares the second target pixel with the second corresponding pixel according to the same operation S810.

For example, the intersection determiner 140 compares the comparative direction coordinate values of two pixels with each other. When the comparative direction coordinate value of the second target pixel is less than that of the second corresponding pixel, the intersection determiner 140 acquires 'less' as the second comparison result.

In operation S830, the intersection determiner 140 determines whether the first comparison result and the second comparison result are the same.

For example, when the first comparison result is 'greater' and the second comparison result is 'less', the intersection determiner 140 determines that the first comparison result and the second comparison result are not the same.

When it is determined in operation S830 that the first comparison result and the second comparison result are the same, this corresponds to a case where two points of the trajectory line belong to one of the two areas defined by the counting line (or the extending line of the counting line). Thus, the intersection determiner 140 may determine that the counting line (or the extending line of the counting line) and the trajectory line do not intersect, in operation S840.

On the other hand, when it is determined in operation S830 that the first comparison result and the second comparison result are different, this corresponds to a case where two points of the trajectory line respectively belong to the two areas defined by the counting line (or the extending line of the counting line). Thus, the intersection determiner 140 may determine that the counting line (or the extending line of the counting line) and the trajectory line intersect, in operation S850.

FIG. 9 is a flowchart of an intersecting or non-intersecting determining method according to another exemplary embodiment.

Even when it is determined that the counting line (or the extending line of the counting line) and the trajectory line intersect (see operation S850 of FIG. 8), a case where, due to inclusion of the extending line pixels in the index list, the trajectory line intersects with the extending line rather than with the counting line may occur.

Referring to FIG. 1 and FIG. 9, the intersecting or non-intersecting determining method according to another exemplary embodiment includes an operation in which the intersection determiner 140 classifies the index list into a plurality of sections in order to determine whether the trajectory line intersects with the counting line or the extending line, operations S910 and S930 in which the intersection determiner 140 determines whether all corresponding pixels belong to an internal section or an external section, operations S920 and S940 in which the intersection determiner 140 determines whether the trajectory line intersects with the counting line or the extending line, according to results of the section determinations, and operation S950 in which, when the corresponding pixels respectively belong to two of the plurality of sections, the target pixel determiner 120 and the corresponding pixel determiner 130 re-determine a target pixel and a corresponding pixel.

First, the intersection determiner 140 may classify the index list into a first external section corresponding to a first extending line piece not overlapped by the counting line, the first extending line piece including a point adjacent to one of the two end points, a second external section corresponding to a second extending line piece not overlapped by the counting line, the second extending line piece including a point adjacent to the other end point, and an internal section corresponding to a third extending line piece overlapped by the counting line, the internal section including the two end points of the counting line.

Next, in operation S910, the intersection determiner 140 determines whether all of corresponding pixels belong to the internal section.

When it is determined in operation S910 that all of the corresponding pixels belong to the internal section, the intersection determiner 140 determines that the trajectory line intersects with the counting line, in operation S920.

When it is determined in operation S910 that not all of the corresponding pixels belong to the internal section, the intersection determiner 140 determines whether all of the corresponding pixels belong to an external section, in operation S930.

When the external section is divided into the first external section and the second external section based on the two end points of the counting line as described above, the intersection determiner 140 may determine whether all of the corresponding pixels belong to the first external section or the second external section.

When it is determined in operation S930 that all of the corresponding pixels belong to the external section, the intersection determiner 140 determines that the trajectory line does not intersect with the counting line, in operation S940.

In operation S940, the trajectory line intersects the extending line.

When it is determined in operation S930 that not all of the corresponding pixels belong to the external section, the intersection determiner 140 may request the target pixel determiner 120 and the corresponding pixel determiner 130 to re-determine a target pixel and a corresponding pixel, in operation S950.

A method of re-determining a target pixel in operation S950 may be the same as the above-described method of FIG. 6.

After operation S950, the intersection determiner 140 of FIG. 1 re-performs operation S910 by using the re-determined corresponding pixel. Thus, this process may be repeated until intersecting or non-intersecting is determined.

Figure 10:
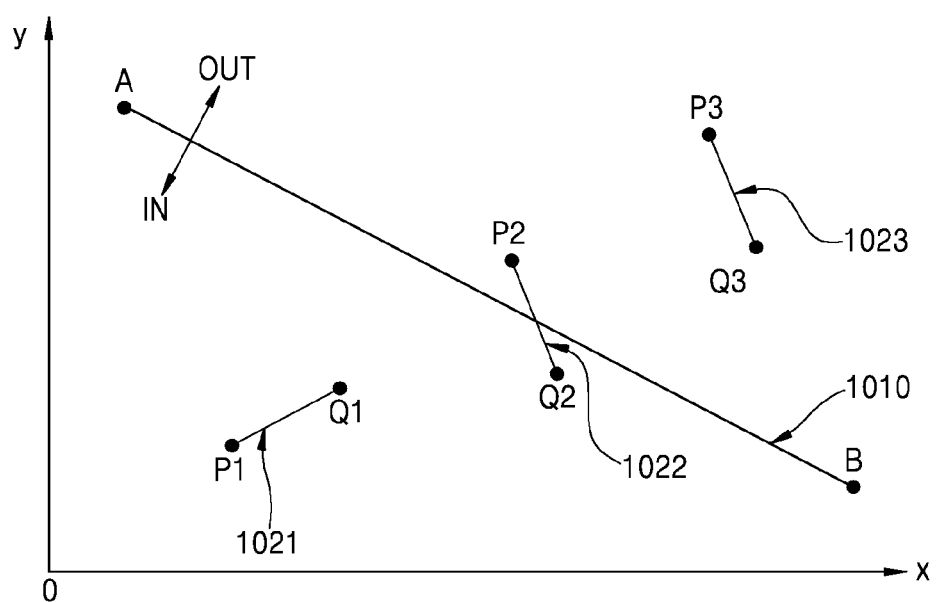
FIG. 10 is a graph showing a counting line and a trajectory line according to an exemplary embodiment.

FIG. 10 is a graph showing a counting line and a trajectory line according to an exemplary embodiment.

Referring to FIG. 10, the counting line and the trajectory line according to an exemplary embodiment are represented on a 2D plane.

The counting line and the trajectory line may be vector lines, but a case where the counting line and the trajectory line are scalar lines that may be rasterized on a 2D image and represented as a 2D coordinate value will now be assumed and described.

On the 2D image, a counting line 1010 and a plurality of trajectory lines 1021, 1022, and 1023 may exist.

Each line may have two end points. For example, two end points of the counting line 1010 may be A and B, and two end points of a first trajectory line 1021 may be P1 and Q1.

An intersecting direction of the counting line may be set. For example, an 'IN' direction may be set as a first intersecting direction, and an 'OUT' direction may be set as a second intersecting direction.

A trajectory line may have a traveling direction. For example, the first trajectory line 1021 may have a traveling direction having the end point P1 as a starting point and the end point Q1 as an ending point.

In other words, intersecting or non-intersection between a counting line and a trajectory line and a direction in which the counting line and the trajectory line intersect may be determined via the intersecting direction of the counting line and the traveling direction of the trajectory line.

Figure 11:
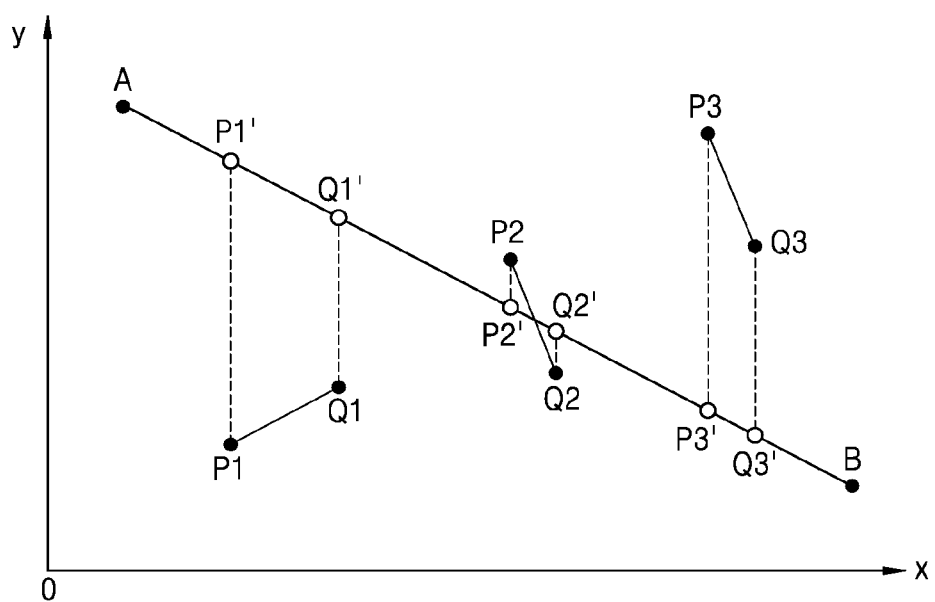
FIG. 11 is a graph showing a method of determining line intersection according to an exemplary embodiment.

FIG. 11 is a graph showing an intersecting or non-intersecting determining method according to an exemplary embodiment.

Referring to FIGS. 1 and 11, a method of determining whether each of the trajectory lines of FIG. 10 intersects with the counting line of FIG. 10 is illustrated.

First, the target pixel determiner 120 may determine two end points of each trajectory line as target pixels. For example, the two end points P1 and Q1 of a first trajectory line may be determined as target pixels, the two end points P2 and Q2 of a second trajectory line may be determined as target pixels, and the two end points P3 and Q3 of a third trajectory line may be determined as target pixels.

Next, the corresponding pixel determiner 130 may determine, as a corresponding pixel, a pixel having the same reference direction coordinate value as each target pixel. For example, when a reference direction coordinate is an x-direction coordinate, a pixel P1' having the same x-direction coordinate as the target pixel P1 may be determined as a corresponding pixel, and a pixel Q1' having the same x-direction coordinate as the target pixel Q1 may be determined as a corresponding pixel.

Next, the intersection determiner 140 may determine intersecting or non-intersecting by comparing a comparative direction coordinate value of the target pixel with that of the corresponding pixel.

For example, when the reference direction coordinate is an x-direction coordinate, the comparative direction coordinate may be a y-direction coordinate. When the y-direction coordinate values of the target pixel P1 and the corresponding pixel P1' are compared, the y-direction coordinate value of the target pixel P1 is less than that of the corresponding pixel P1', and thus a first comparison result may be 'less'. When the y-direction coordinate values of the target pixel Q1 and the corresponding pixel Q1' are compared, the y-direction coordinate value of the target pixel Q1 is less than that of the corresponding pixel Q1', and thus a second comparison result may also be 'less'. Since the two comparison results of the first trajectory line are the same as each other, it may be determined that the first trajectory line does not intersect with the counting line.

In this method, when intersecting or non-intersecting between the second trajectory line and the counting line is determined, since the y-direction coordinate value of the target pixel P2 is greater than that of the corresponding pixel P2', a first comparison result may be 'greater'. When the y-direction coordinate value of the target pixel Q2 is less than that of the corresponding pixel Q2', a second comparison result may be 'less'. Thus, since the two comparison results of the second trajectory line are different from each other, it may be determined that the second trajectory line intersects with the counting line.

When a counting line and a trajectory line intersect, the intersection determiner 140 may further determine an intersecting direction in which the counting line and the trajectory line intersect.

For example, when a comparison result with respect to a starting point of the first trajectory line is 'greater', the intersection determiner 140 may determine that an intersecting direction is a first intersecting direction. When a comparison result with respect to the starting point of the first trajectory line is 'less', the intersection determiner 140 may determine that the intersecting direction is a second intersecting direction. Since a comparison result with respect to P2 (first comparison result) of the second trajectory line is 'greater', an intersecting direction in which the second trajectory line intersect with the counting line may be the first intersecting direction.

Figure 12A:
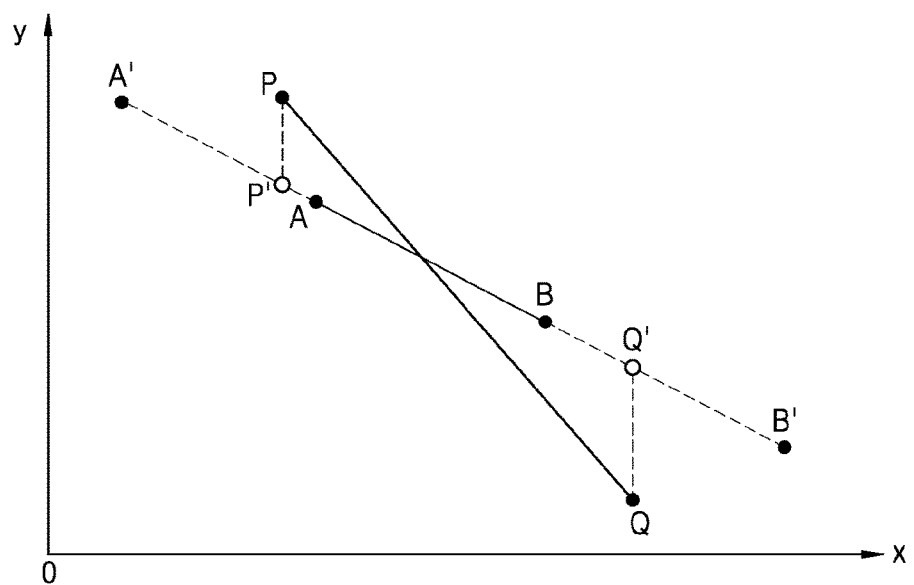
FIGS. 12A, 12B, and 12C are graphs showing a method of determining line intersection according to another exemplary embodiment.
Figure 12B:
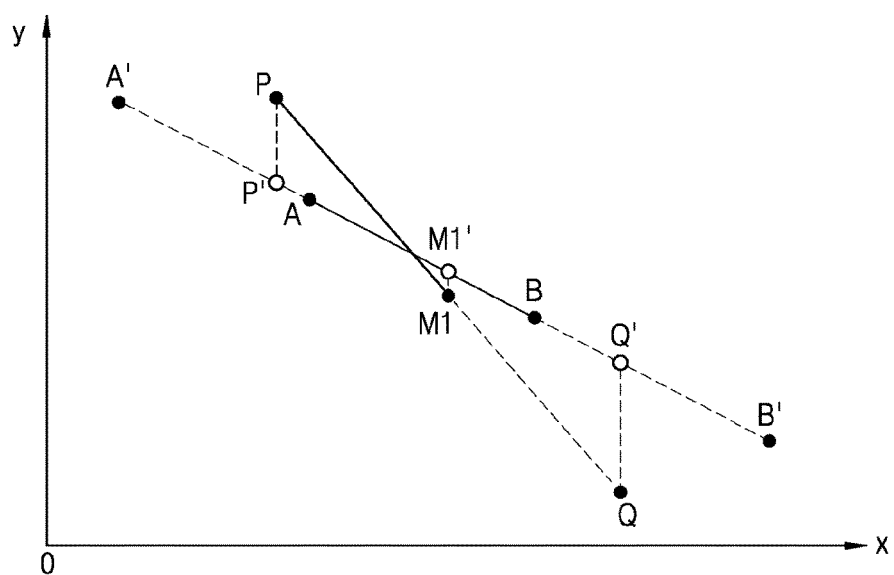
Figure 12C:
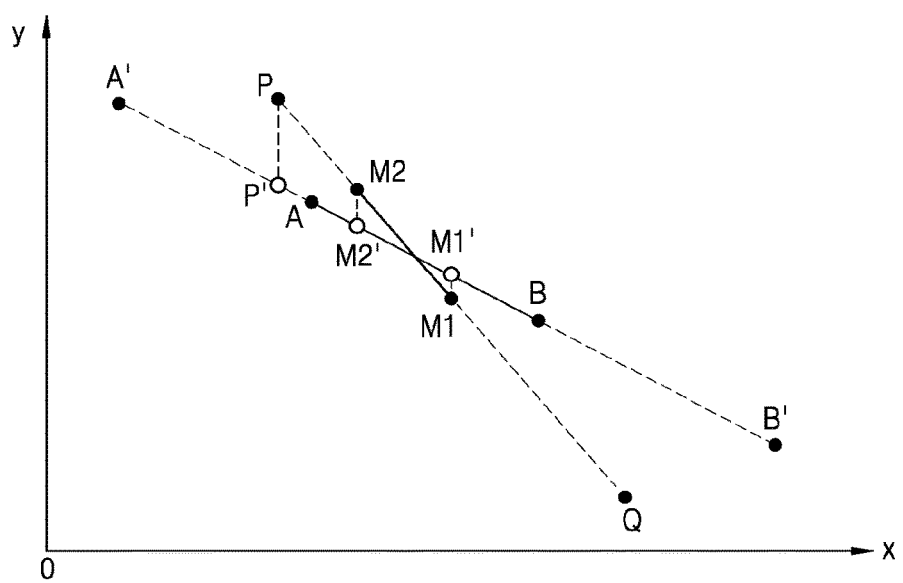

FIGS. 12A, 12B, and 12C are graphs showing an intersecting or non-intersecting determining method according to another exemplary embodiment.

Referring to FIGS. 1 and 12A-12C, a counting line and a trajectory line according to an exemplary embodiment are represented on a 2D plane, and two end points of the counting line are A and B and two end points of the trajectory line are P and Q.

In the exemplary embodiment of FIGS. 12A-12C, when the counting line is set to be relatively short on an image and thus an index list is generated using only the counting line, corresponding pixels corresponding to target pixels P and Q do not exist.

In this case, as shown in FIG. 12A, the index list generator 110 may generate an extending line such that the two end points extend to A' and B', and re-generate an index list including the extending line. Thus, corresponding pixels P' and Q' exist within the index list.

In this case, even when intersecting or non-intersecting is determined using the same method as that in FIG. 11, it may be determined that the counting line and the trajectory line intersect, when the corresponding pixels P' and Q' are included in a counting line section (A-B).

Thus, as shown in FIG. 12B, after an additional corresponding pixel M1 is set on the trajectory line, intersecting or non-intersection may be determined with respect to the target pixel P and the additional corresponding pixel M1. After intersecting or non-intersection is determined with respect to the additional corresponding pixel M1 and the target pixel Q, only two pixels determined to intersect with the counting line may be determined as new target pixels P and M1.

As such, when a target pixel is repeatedly re-determined, corresponding pixels M2' and M1' belong to the counting line section (A-B) as a result as shown in FIG. 12C. Finally, it may be determined that the counting line and the trajectory line intersect.

However, when a corresponding pixel belongs to an extending line section A'-A or B-B' when a target pixel is repeatedly re-determined, it may be finally determined that the counting line and the trajectory line do not intersect.

In an image-based object counting method and apparatus according to an exemplary embodiment, it may be determined whether an object has passed through a counting line, by using a determination as to whether the counting line and a trajectory line intersect.

In an image-based object counting method and apparatus according to an exemplary embodiment, the number of calculations required for object counting may be reduced by determining intersecting or non-intersecting between a counting line and a trajectory line and a direction of intersection between the counting line and the trajectory line by only comparing coordinate values of two points on the trajectory line with those of points on the counting line.

The above-described exemplary embodiments may be implemented in the form of a computer program executable via various elements on a computer. Such a computer program may be recorded on a computer readable medium. Examples of the computer readable medium include a magnetic medium (e.g., a hard disk, a floppy disk, or a magnetic tape), an optical medium (e.g., a compact disk-read-only memory (CD-ROM) or a digital versatile disk (DVD), a magneto-optical medium (e.g., a floptical disk), and a hardware device specially configured to store and execute program commands (e.g., a ROM, a random-access memory (RAM), or a flash memory). Examples of the computer readable medium may further include an intangible medium that is implemented to be transmittable over a network. For example, the computer readable medium may be a medium that is implemented as software or an application and is transmittable and distributable over the network.

The computer program may be specially designed and configured for exemplary embodiments or may be well-known to and be usable by one of ordinary skill in the art of computer software. Examples of the computer program include advanced language codes that can be executed by a computer by using an interpreter or the like as well as machine language codes made by a compiler.

The particular implementations shown and described herein are illustrative exemplary embodiments and are not intended to otherwise limit the scope of exemplary embodiments in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical apparatus. Moreover, no item or component is essential to the practice of the inventive concept unless the element is specifically described as "essential" or "critical".

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image-based object counting method comprising:
rasterizing a counting line in an image into counting line pixels;
determining two points on a trajectory line included in the image as target pixels;
determining, from the counting line pixels, corresponding pixels that correspond to the target pixels;
determining whether the counting line intersects with the trajectory line based on the target pixels and the corresponding pixels; and
determining a number of one or more trajectory lines including the trajectory line that intersect with the counting line as a number of objects that pass the counting line, wherein
the determining of whether the counting line intersects with the trajectory line comprises determining that the counting line intersects with the trajectory line when a first result of comparison between a first target pixel from the target pixels and a first corresponding pixel corresponding to the first target pixel is different from a second result of comparison between a second target pixel from the target pixels and a second corresponding pixel corresponding to the second target pixel,
the determining of the corresponding pixels comprises, when one of two direction coordinates is a reference direction coordinate, determining, as the corresponding pixels, pixels having same reference direction coordinate values as the target pixels from among the counting line pixels,
the determining of whether the counting line intersects with the trajectory line comprises, when the other direction coordinate is a comparative direction coordinate, determining, as the first result of the comparison, whether a difference between a comparative direction coordinate value of the first target pixel and a comparative direction coordinate value of the first corresponding pixel is greater than 0, and determining, as the second result of the comparison, whether a difference between a comparative direction coordinate value of the second target pixel and a comparative direction coordinate value of the second corresponding pixel is greater than 0, and
the determining of the corresponding pixels comprises determining one of the two direction coordinates as the reference direction coordinate and determining the other direction coordinate as the comparative direction coordinate, based on an inclination of the counting line.

2. The image-based object counting method of claim 1, further comprising generating an index list including the counting line pixels,
wherein the determining of the corresponding pixels comprises:
determining whether the corresponding pixels corresponding to the target pixels exist within the index list;
re-generating the index list when the corresponding pixels do not exist within the index list; and
determining the corresponding pixels from among the re-generated index list.

3. The image-based object counting method of claim 2, wherein the re-generating of the index list comprises:
generating an extending line that extends from the counting line;
rasterizing the extending line in the image into extending line pixels; and
regenerating the index list including the counting line pixels and the extending line pixels.

4. The image-based object counting method of claim 3, wherein the determining of whether the counting line intersects with the trajectory line comprises:
classifying the index list into a plurality of sections when the extending line pixels are included in the index list; and
re-determining the target pixels when the corresponding pixels respectively belong to two different sections of the plurality of sections.

5. The image-based object counting method of claim 4, wherein the classifying of the index list into the plurality of sections comprises classifying the index list into a first external section corresponding to a first extending line piece not overlapping the counting line, the first extending line piece comprising a point adjacent to one of two end points of the counting line, a second external section corresponding to a second extending line piece not overlapping the counting line, the second extending line piece comprising a point adjacent to the other end point, and an internal section corresponding to a third extending line piece overlapped by the counting line, the internal section comprising the two end points of the counting line.

6. The image-based object counting method of claim 5, wherein the determining of whether the counting line intersects with the trajectory line comprises determining that the counting line does not intersect with the trajectory line when all of the corresponding pixels belong to the first external section or the second external section, and determining that the counting line intersects with the trajectory line, when all of the corresponding pixels belong to the internal section.

7. The image-based object counting method of claim 6, wherein the re-determining of the corresponding pixels comprises:
determining one point on the trajectory line as an additional target pixel;
acquiring an additional corresponding pixel corresponding to the additional target pixel from among the index list;

selecting a target pixel from the target pixels based on the target pixels, the additional target pixel, the corresponding pixels, and the additional corresponding pixel; and determining the selected target pixel and the additional target pixel as the target pixels.

8. The image-based object counting method of claim 7, wherein the determining of the additional target pixel comprises determining a center point between the target pixels as the additional target pixel.

9. The image-based object counting method of claim 7, wherein the selecting of the one from the target pixels comprises selecting the first target pixel from the target pixels when the first result of the comparison between the first target pixel and the first corresponding pixel corresponding to the first target pixel is different from an additional result of comparison between the additional target pixel and the additional corresponding pixel.

10. The image-based object counting method of claim 1, further comprising:

generating an extending line that extends from the counting line;

rasterizing the extending line in the image into extending line pixels; and generating an index list including the counting line pixels and the extending line pixels.

11. The image-based object counting method of claim 1, wherein the determining of whether the counting line intersects with the trajectory line comprises further determining an intersecting direction of an object that moves along the trajectory line when the counting line intersects with the trajectory line, and the determining the number of one or more trajectory lines comprises counting the number of objects for each intersecting direction.

12. The image-based object counting method of claim 11, wherein the determining of whether the counting line intersects with the trajectory line comprises, when the difference between the comparative direction coordinate value of the first target pixel and the comparative direction coordinate value of the first corresponding pixel is greater than 0, determining that the intersecting direction is a first intersecting direction, and when the difference between the comparative direction coordinate value of the second target pixel and the comparative direction coordinate value of the second corresponding pixel is greater than 0, determining that the intersecting direction is a second intersecting direction different from the first intersecting direction.

13. An image-based object counting apparatus comprising one or more processors implementing:

an index generator configured to rasterize a counting line in an image into counting line pixels and generate an index list including the counting line pixels;

a target pixel determiner configured to determine two points on a trajectory line included in the image as target pixels;

a corresponding pixel determiner configured to determine corresponding pixels that correspond to the target pixels from among the index list;

an intersection determiner configured to determine whether the counting line intersects with the trajectory line based on the target pixels and the corresponding pixels; and an object counter configured to determine a number of one or more trajectory lines including the trajectory line that intersect with the counting line as a number of objects that pass the counting line, wherein the corresponding pixel determiner is further configured to:

determine that the counting line intersects with the trajectory line when a first result of comparison between a first target pixel from the target pixels and a first corresponding pixel corresponding to the first target pixel is different from a second result of comparison between a second target pixel from the target pixels and a second corresponding pixel corresponding to the second target pixel;

when one of two direction coordinates is a reference direction coordinate, determine, as the corresponding pixels, pixels having same reference direction coordinate values as the target pixels from among the counting line pixels, when the other direction coordinate is a comparative direction coordinate, determine, as the first result of the comparison, whether a difference between a comparative direction coordinate value of the first target pixel and a comparative direction coordinate value of the first corresponding pixel is greater than 0, and determine, as the second result of the comparison, whether a difference between a comparative direction coordinate value of the second target pixel and a comparative direction coordinate value of the second corresponding pixel is greater than 0; and determine one of the two direction coordinates as the reference direction coordinate and determine the other direction coordinate as the comparative direction coordinate, based on an inclination of the counting line.

14. The image-based object counting apparatus of claim 13, wherein the intersection determiner is configured to determine that the counting line intersects with the trajectory line when a first result of comparison between a first target pixel from the target pixels and a first corresponding pixel corresponding to the first target pixel is different from a second comparison result as a second result of comparison between a second target pixel from the target pixels and a second corresponding pixel corresponding to the second target pixel.

15. The image-based object counting apparatus of claim 14, wherein the corresponding pixel determiner is configured to determine, as the corresponding pixels, pixels having the same reference direction coordinate values as the target pixels from among the index list, and the intersection determiner determines, as the first result of the comparison, whether a difference between a comparative direction coordinate value of the first target pixel and a comparative direction coordinate value of the first corresponding pixel is greater than 0, and determines, as the second result of the comparison, whether a difference between a comparative direction coordinate value of the second target pixel and a comparative direction coordinate value of the second corresponding pixel is greater than 0.

16. The image-based object counting apparatus of claim 13, wherein the corresponding pixel determiner is configured to determine whether the corresponding pixels corresponding to the target pixels exist within the index list, the index list generator is configured to re-generate the index list when the corresponding pixels do not exist within the index list, and the corresponding pixel determiner is configured to determine the corresponding pixels from among the re-generated index list.

17. The image-based object counting apparatus of claim 16, wherein, when the corresponding pixels do not exist within the index list, the index list generator is configured to generate an extending line that extends from the counting line, rasterizing the extending line in the image into extending line pixels, and generate the index list including the counting line pixels and the extending line pixels.

* * * * *